April 29, 1924.
W. R. STUCK
1,492,050
METHOD OF MAKING FLOWER HOLDERS
Filed Feb. 7, 1923     2 Sheets-Sheet 1
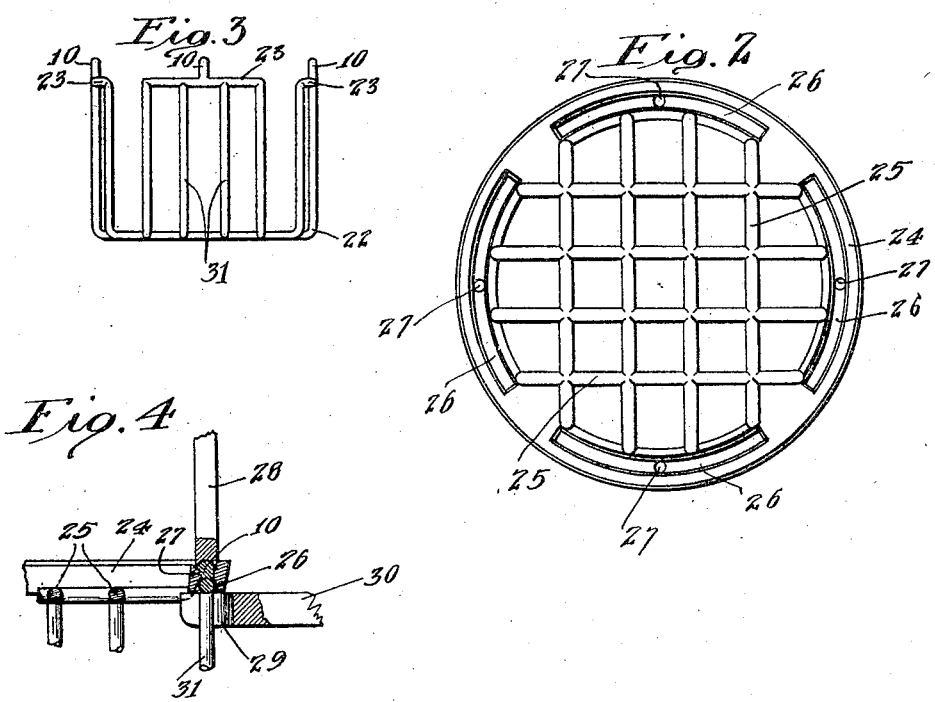
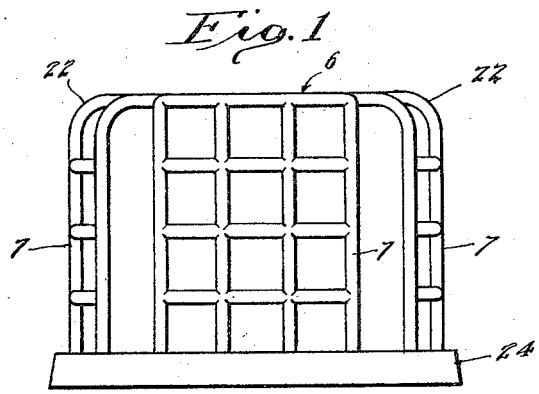
Inventor
William R. Stuck
By Lyon & Lyon
attys April 29, 1924.
W. R. STUCK
METHOD OF MAKING FLOWER HOLDERS
Filed Feb. 7, 1923   2 Sheets-Sheet 2
1,492,050
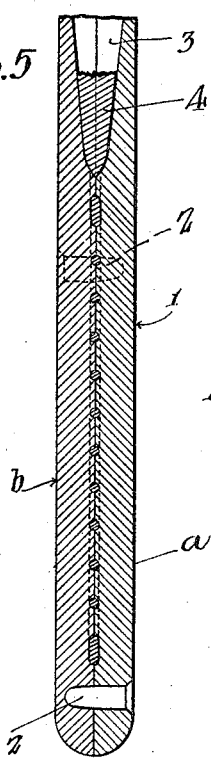
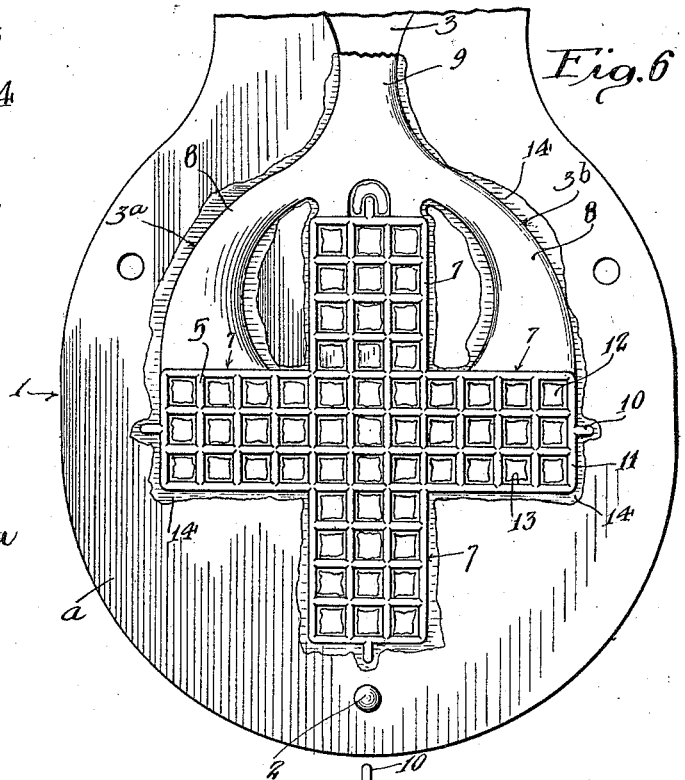
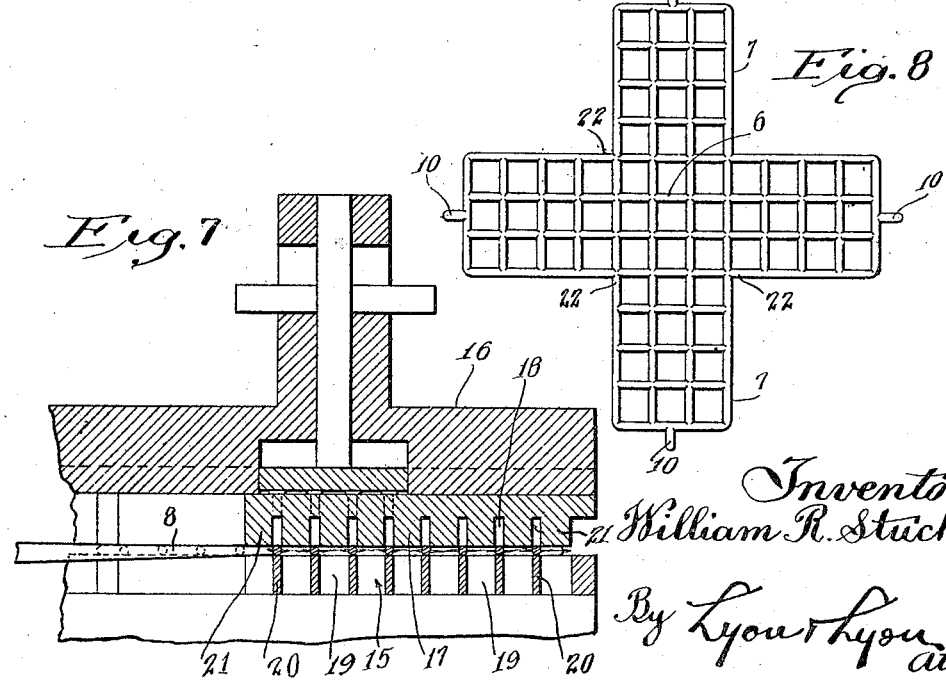
Inventor
William R. Stuck
By Lyon & Lyon
Atty Patented Apr. 29, 1924.

1,492,050

UNITED STATES PATENT OFFICE.

WILLIAM R. STUCK, OF LOS ANGELES, CALIFORNIA, ASSIGNOR TO DAZEY MANUFACTURING COMPANY, OF LOS ANGELES, CALIFORNIA, A CORPORATION OF CALIFORNIA.

METHOD OF MAKING FLOWER HOLDERS.

Application filed February 7, 1922. Serial No. 617,428.

*To all whom it may concern:*

Be it known that I, WILLIAM R. STUCK, a citizen of the United States, residing at Los Angeles, in the county of Los Angeles and State of California, have invented a new and useful Method of Making Flower Holders, of which the following is a specification.

This invention relates to a holder for holding cut flowers and is the same type of holder described in my Patent No. 1,196,312, granted to me on August 29, 1916. It was attempted to form the body of such a holder of wire gauze bent to the desired form and secured to a ring or base. Performing these operations by hand entails an enormous amount of labor. It was attempted to cut the wire gauze sheet by means of a die, but it was found that the mesh of the wire sheet was not uniform and so variable that a die could not be used to advantage. The general object of the present invention is to provide a method which will overcome this difficulty, and which will enable a flower holder of this type to be constructed in a simple manner. A further object of the invention is to provide a method enabling a grid to be molded and finished in a simple manner so that the parts of the grid are free from projecting fins, thereby enabling the grid to be used as a flower holder. Further objects of the invention will appear hereinafter.

The invention consists in the novel steps and in the method to be described in the following specification and set forth in the claims.

A preferred embodiment of the invention is described in the following specification while the broad scope of the invention is pointed out in the appended claims.

In the drawing—

Figure 1 is a side elevation showing a complete flower holder constructed according to my method.

Fig. 2 is a plan of the lower grid and base of the flower holder.

Fig. 3 is a side elevation showing the upper grid of the holder bent to concavoconvex form, that is to say, showing the basket portion of the holder at one stage in the method of making the holder.

Fig. 4 is a cross section taken through the base ring of the holder and illustrating one of the final steps in the process or method.

Fig. 5 is a vertical section through a flask or mold showing the same filled with the cast metal.

Fig. 6 is a plan showing one side of the flask lying open and showing the grid before being taken from the mold.

Fig. 7 is a vertical section taken through an edge of a punch and die, and illustrating a later step in the formation of the finished grid.

Fig. 8 is a plan of a complete grid showing its form when it is ready to be bent into the basket shape.

In carrying out my method I mold the grid with bars and openings between the bars. By reason of the fact that in molding operations the mold must be vented or its sections fitted loosely to permit the air to escape, it is desirable that the sections of the mold should not be tightly clamped together; for this reason in forming the grid, fins are formed along the bars. These fins are located at the openings and also on the outer sides of the bars. According to my method I mold the grid and then punch out the fins projecting from the bars on the edges of the openings. I also shear off any projections from the outer edges of the grid which are occasioned in molding the same. I prefer to conduct both of these operations simultaneously in a punch or shearing machine. The grid can then be used as a simple grid for holding the stems of flowers in an upright position. However, I prefer to bend the grid up thereafter into concavoconvex form, or basket form, and secure its edges to a base ring. In order to accomplish this I provide a mold 1 which may be in the form of a flask divided on its medial plane into two sections, *a* and *b*. These sections may be provided with dowels 2 which center the mold sections when they are brought together. The interior of the mold is formed with two sets of grooves each set extending at right angles to the other set so that when antimonial lead or other composition is poured into the gate 3 of the mold, a grid 4 will be formed, see Figure 6.

The lead hardens very quickly, and in order to insure an ample supply of the molten metal to all parts of the grid, and on account of the fact that the grooves which form the bars 5 of the grid are too small to operate as effective ducts for the hot metal, I provide the gate 3 with extensions or side channels $3^a$ and $3^b$ which lead to opposite sides of the grid, that is to say, I produce a grid of cruciform shape having a central portion 6, and outwardly projecting wings 7, and I construct the mold so that two of these wings 7 will be horizontal and one of the wings will project up towards the gate 3 of the mold. By simply bifurcating the gate 3 within the mold I lead the molten metal over to each of the lateral wings 7. The form of the mold as regards this feature will appear clearly from an inspection of Figure 6 which shows two webs 8 of metal which extend down from a tongue 9 which is formed in the gate proper, the lower ends of the webs 8 being cast in one piece with the uppermost bars of the laterally projecting side wings 7. The upper end of the uppermost vertical wing 7 is supplied directly from the middle portion of the gate 3.

I prefer to cast the grid with means on it to facilitate its being attached to a base or frame. For this purpose the mold is constructed with grooves to produce outwardly projecting pintles 10 which project outwardly from the outermost bars 11 of the wing. When the grid is removed from the mold the openings 12 between the bars are not clear, but fins 13 of irregular shape project into the openings from the inner edges of the bars. Similar fins 14 project along the outer sides of the outermost bars and around the sides of the pintles 10.

In order to complete the grid I remove the fins 13 and 14 and I also prefer to shear off the webs 8 of the metal in the same operation. In order to accomplish this I place the grid 4 in a die 15, see Figure 7, below a punch 16, the said punch having a plurality of individual punches 17 which are simply small rectangular projections with slots 18 between them. As the punch 16 descends the individual punches 17 pass through the openings between the bars of the grid and pass down into openings 19 in the die 15. The die is formed with bars or rests 20 which correspond to the bars of the grid and support the same as the punch descends. The punch is also provided with a shear 21 which extends along the outer side of the outermost bars of the grid, and around the pintles so that this shear 21 operates when the punch descends to cut off all projecting metal around the grid. After this operation the grid has the finished form shown in Figure 8.

I then proceed to bend this grid up into basket form or concavo-convex form so that the grid after bending has substantially the appearance indicated in Figure 3. This bending is accomplished by bending the wings near their roots, that is to say, at about the points 22, see Figure 8. In bending the wings up in this way, I also bend the end bars 23 of the wings so that they are of arcuate form and form sections of a circle having its center on the central axis of the central portion 6 of the grid. This of course leaves the pintles 10 projecting upwardly. Having produced the basket form body of the holder in this way, I then produce a base which is preferably attached to the basket portion of the holder by means of the pintles 10. In order to accomplish this I cast another grid of the form illustrated in Figure 2, consisting of a ring 24 which is cast integrally with cross bars 25 forming a grid. The upper face of the ring 24 is preferably provided with a plurality of circumferential grooves 26 and at the middle points of these grooves 26 a perforation 27 is formed. The circle formed by the upper end of the basket illustrated in Figure 3 is of the same diameter as the circle formed by the plurality of grooves 26 and the perforations 27 correspond in position to the pintles 10. The basket grid in the form shown in Figure 3 can therefore be inverted and applied to the ring 24 so that the arcuate end bars 23 will be received in the grooves 26 with the pintles 10 projecting through the perforations 27. In order to secure the pintles in the perforations they may be riveted down by a rotary spinning tool 28. In using the spinning tool 28 the article is held in an inverted position with the edge of the base ring 24 supported on the forks 29 of a rest 30, see Figure 4, the said forks lying on each side of the adjacent bar 31 of the basket grid. In this way the pintles may be quickly secured and after the riveting or spinning operation the holder is complete. It is entirely symmetrical and presents a sightly and salable appearance. It also performs its functions of a flower holder and when doing so is held in the position shown in Figure 1. The central portion 6 of the basket grid operates to support the upper parts of the stems of the flowers while the bars 25 of the bottom grid hold the lower ends of the stems. The low price of lead enables these holders to be produced at a very low expense.

It is understood that the embodiment of the invention described herein is only one of the many embodiments this invention may take and I do not wish to be limited in the practice of my invention nor in my claims to the particular embodiments set forth.

What I claim is:

1. The method of making a holder for cut flowers which consists in molding a grid with bars and openings between the bars, punching out the fins projecting from the sides of the bars, and bending the grid thereafter into concavo-convex form.

2. The method of making a holder for cut flowers which consists in molding a grid with bars and openings between the bars, punching out the fins projecting from the bars at the edges of the openings and simultaneously shearing the fins which project from the outer sides of the bars, and bending the grid thereafter into concavo-convex form.

3. The method of making a holder for cut flowers which consists in molding a grid with bars and openings between the bars, punching out the fins projecting from the bars at the edges of the openings and simultaneously shearing the fins which project from the outer sides of the bars, bending the grid thereafter into concavo-convex form, and attaching a substantially flat grid to the edge of the concavo-convex grid.

4. The method of making a holder for cut flowers which consists in molding a grid with bars and openings between the bars, punching out the fins projecting from the bars at the edges of the openings and simultaneously shearing the fins which project from the outer sides of the bars, bending the grid thereafter into concavo-convex form, forming a substantially flat grid with a ring at its edge and attaching the edge of the concavo-convex grid to the said ring.

5. The method of making a holder for cut flowers, which consists in molding a grid with bars and openings between the bars, punching out the fins produced in the molding and projecting from the sides of the bars at the openings, molding a substantially flat grid with a ring at its edge having an annular groove in its side face, bending the first named grid into concavo-convex form, and securing its edge in the annular groove.

6. The method of making a holder for cut flowers which consists in molding a grid with pintles projecting outwardly from the edges of the grid, bending the grid thereafter into concavo-convex form, molding another grid with a ring at its edge, forming apertures in the ring, inserting the pintles in the apertures and riveting the same therein.

7. The method of making a holder for cut flowers which consists in molding a grid with a central portion and wings projecting outwardly from the central portion, bending the rings to give the grid a concavo-convex form, forming a substantially flat grid with a ring at its edge, and attaching the edge of the concavo-convex grid to the said ring.

8. The method of making a cruciform grid having a center panel and outwardly projecting wings, which consists in molding the grid in a substantially upright mold with gates for delivering the molten metal to the upper edges of two oppositely disposed wings and to the upper edge of one of the other wings, removing the grid from the mold with the extensions formed in the said gates and punching out the openings of the grid and shearing the said extensions to form the finished grid.

9. The method of making a grid for holding cut flowers which consists in molding the grid with bars and openings between the bars, and punching off the fins adhering to the sides of the bars thereafter.

Signed at Los Angeles, California, this 11th day of January, 1923.

WILLIAM R. STUCK.